Nov. 26, 1968

S. HARCUBA 3,412,510

FIXTURE WITH AT LEAST ONE INSTALLATION UNIT
FORMED OF GLASS ELEMENTS

Filed Dec. 9, 1966

INVENTOR:
Siegfried Harcuba
By Jacob E. Davidson
Attorneys

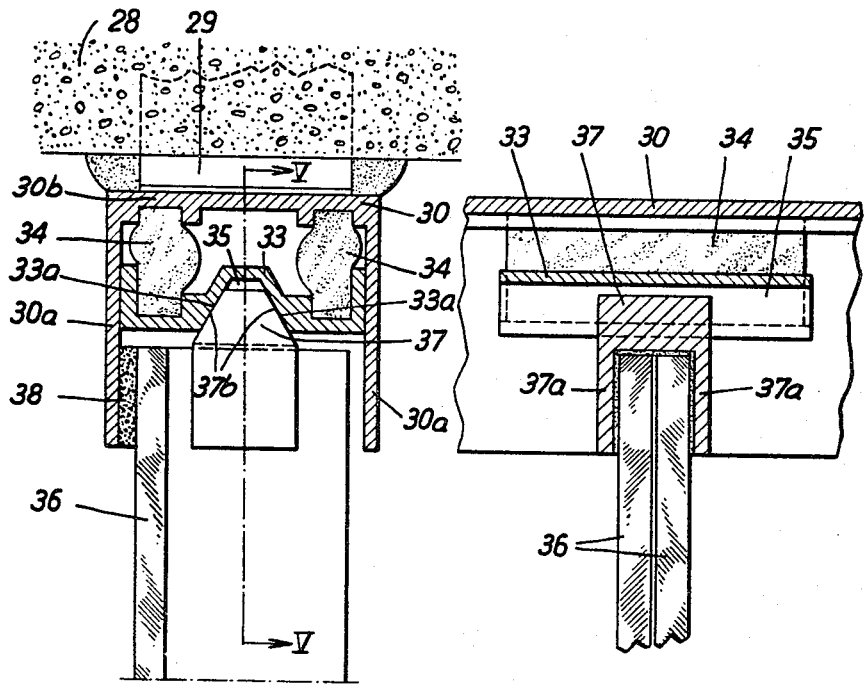

United States Patent Office 3,412,510
Patented Nov. 26, 1968

3,412,510
FIXTURE WITH AT LEAST ONE INSTALLATION
UNIT FORMED OF GLASS ELEMENTS
Siegfried Harcuba, St. Gall, Switzerland, assignor to
Transglas A.G., Chur, Graubunden, Switzerland
Filed Dec. 9, 1966, Ser. No. 600,530
Claims priority, application Switzerland, June 7, 1966,
8,169/66; Dec. 10, 1965, 17,051/65
11 Claims. (Cl. 52—127)

ABSTRACT OF THE DISCLOSURE

A fixture or frame with at least one installation unit of glass elements manufactured as a prefabricated unit. At least one attachment rail is displaceable in a guide parallel to the plane of the glass. Resilient members act on the displaceable rail and an inclined guide surface cooperates with the resilient members for ready installation of the prefabricated unit in a building.

The present invention relates to an improved fixture or frame with at least one installation unit formed of glass elements held together by connecting means and further incorporates a plurality of resilient elements which act substantially parallel to the plane of such glass elements.

The idea of using glass as building material and to assemble pre-fabricated glass elements into installation or construction units and to deliver such ready for installation to the construction site is obvious. However, up to the present it was not possible to make full use of the advantages of prefabrication since, on the one hand, the known installation elements were not capable of being assembled together into a suitable transportable unit and, on the other hand, they still required quite considerable installation work at the construction site. Furthermore, certain misgivings existed towards any more extensive pre-fabrication since it was feared that, because of the measures which would allow for a more widespread pre-fabrication and the therewith associated reduction of the work which would have to be undertaken at the place of construction, drawbacks of a different nature would have to be taken into consideration. Examples of such drawbacks which were contemplated are for instance: Increased difficulty in exchanging broken elements, an increased danger of rupture during vibration of the terrain, a poor taking up of wind loads and impaired possibility of expansion during temperature fluctuations. Also, even only a partial removal of such disadvantages would nonetheless raise some doubts as to its commercial value.

Now, the present invention is concerned with the provision of an improved installation unit of the mentioned type which provides an advantageous transportable unit and which, notwithstanding the usual inaccuracies in the inner width of the building opening provided for the mounting of the glass wall or the like, can nonetheless be mounted quite easily, without being associated with the aforementioned disadvantages, and wherein the danger of breakage, owing to vibrations, is considerably reduced or minimized.

A further significant object of the present invention resides in the combination of a fixture means with at least one installation unit formed of glass elements, wherein the installation unit is extremely economical to manufacture as a pre-fabricated structure, easy to handle and ship, can be installed rapidly and easily, particularly being capable of accommodating itself to any possible inaccuracies existing at the fixture means, and when installed considerably safeguards against glass breakage.

Generally speaking, the inventive installation unit of the aforementioned type is manifested by the features of at least one attachment rail means which is displaceable in a guide substantially parallel to the plane of the glass elements, said attachment rail means being subjected to the action of the resilient elements and provided with at least one inclined guide surface for determining the relative position of said glass elements with respect to the fixture means.

The invention will be better understood, and objects other than those set forth above, will become apparent, when consideration is given to the following detailed description thereof. Such description makes reference to the annexed drawings disclosing a number of embodiments of the inventive subject matter and wherein:

FIGURE 4 is a longitudinal sectional view through the fixture means together with the installation unit according to a further embodiment of the invention; and FIGURE 5 is a cross-sectional view of the arrangement of FIGURE 4, taken along the line V—V thereof.

Figure 1:
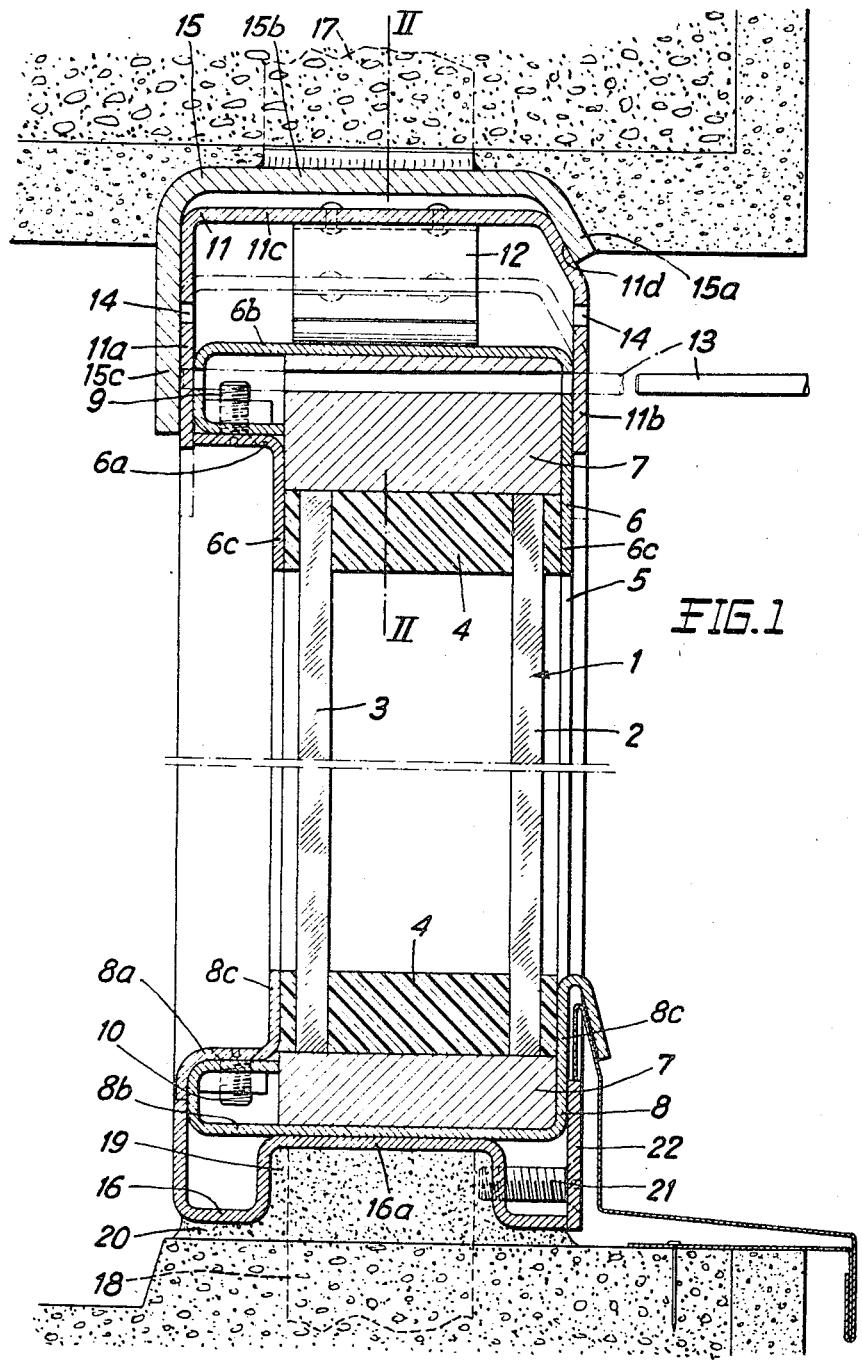
FIGURE 1 is a vertical sectional view through a fixture means provided with an installation unit designed according to a first embodiment of the present invention.
Figure 2:
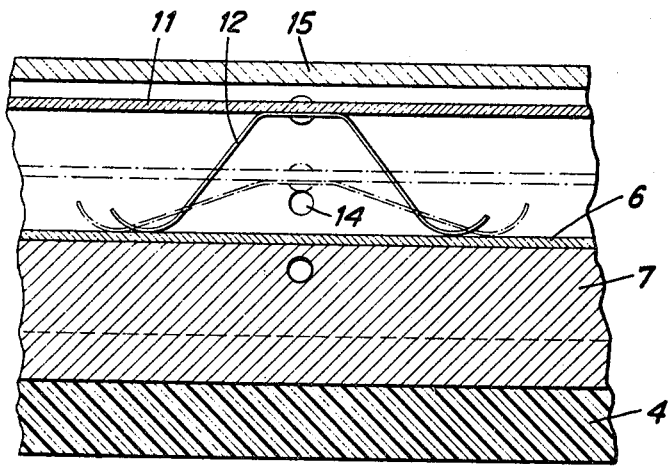
FIGURE 2 is a cross-sectional view of the arrangement shown in FIGURE 1 taken along the line II—II thereof.

Describing now the drawings, in the first embodiment of FIGURES 1 and 2 each installation or construction unit 1 incorporates two glass assemblies or glazing 2 and 3 perferably composed of a number of substantially U-shaped glass sheets or elements which are placed next to one another or alternately engage within one another. These glass assemblies or glazing 2 and 3 are maintained at a predetermined spacing behind one another, both at their upper as well as their lower edges, by suitable spacer means 4 formed of plastic or the like. In order to form a glass wall these elements are laterally aligned in a row next to one another and preferably interconnected by means of a suitable adhesive sealing tape. Extending about the thus formed glass wall is a connecting means constructed in the form of a substantially U-shaped holder frame 5. In the description to follow the portion of this holder frame 5 which engages or encloses the upper edge of the assembled installation unit 1 incorporating the glass assemblies 2 and 3 will be referred to as holder rail 6, whereas the portion or component of the holder frame 5 which engages with the lower edge will be referred to as lower rail 8. The distance or spacer pieces 7 which are inserted in the U-shaped profile of the holder frame 5, and held between the respective U-legs 6c or 8c and bearing against the web 6b or 8b of the relevant profile member, lie against the end faces of the glass assemblies 2 and 3, so that the latter are secured in position within the holder frame 5 in the plane of the glass by the distance pieces 7 and perpendicular thereto by the spacers 4. In this regard, it will be appreciated that the holder rail 6 and the lower rail 8 are constructed of two pieces, whereby the angle rail 6a and 8a respectively, are detachably connected by screw means 9 and 10 respectively, at the web portions 6b and 8b of the aforesaid rails 6 and 8 respectively. Hence, for the replacement of a single glass element it is sufficient to remove the angle rail 6a or 8a and after having completed the replacement operation to again connect such with the holder rail 6 or lower rail 8.

Arranged above the holder rail 6 is an essentially U-shaped attachment rail means 11 which is disposed in such a manner that it engages the holder rail 6 by means of both of its legs 11a and 11b. Consequently, the holder rail 6 can piercingly enter to a greater or lesser extent the U-shape of the attachment rail means 11, during which movement the inner surfaces of the legs 11a, 11b of the attachment rail means 11 serve as guide means for the holder rail 6. A pressure spring 12 serving as a resilient or elastic element and constructed, for instance, in the form of a double blade spring, is secured to the web 11c of the attachment rail means 11. This pressure spring 12 bears with both of its free ends against the upper surface of the web 6b of the holder rail 6, thereby striving to raise the attachment rail means 11 from the holder rail 6. Holder rail 6 and attachment rail means 11 can be held together by means of a suitable securing bolt 13 or equivalent structure which piercingly extends through the corresponding legs 11a, 11b, 6c of the relevant rails 11 and 6 respectively. To this end, it will be recognized that the appropriate through passage openings 14 for the securing bolt 13 are arranged in the legs 11a, 11b of the attachment rail means 11 in such a manner that when this securing bolt 13 is pushed in, the spring 12 is tensioned, as best recognized by a comparison of FIGURES 1 and 2, in particular the phantom line showing thereof. Further, it will be seen that the attachment rail means 11 is provided with an inclined guide surface 11d which is arranged between the outer leg 11b in the installed position and the web 11c. The function of this guide surface 11d will be more fully explained at some point hereinafter in the description. The thus constructed installation unit can be prefabricated in series and forms a transportable unit which is easy to handle and ship.

The preparations which have to be undertaken at the place of construction are essentially limited to the mounting of a suitable fixture means embodying an upper rail means 15 and a lower rail means 16, each equipped with claw means 17 and 18 respectively, or equivalent structure, and which are inserted in the inner width of the opening of the building which is to be covered and secured at the relevant brick work by means of the aforementioned claw means 17, 18. Whereas the lateral rails of the relevant frame or fixture means are constructed as U-shaped and rectangularly rounded profiles, the upper rail 15 possesses a similar U-shaped profile wherein the externally situated leg member 15a is considerably shorter than the opposite leg and forms an angle of more than 90° with the web 15b. The lower rail 16 which, as shown, is rounded at a number of places, in turn, possesses a central offset 16a at which there is secured the relevant claw means 18. This offset 16a comes to bear over an appropriate rib 19 of the lower sill 20, so that the lower rail 16 secures the surrounding frame against lateral displacement, for instance brought about by the action of the wind. The outer leg of the lower rail 16 is formed by a detachable ledge member 22 which is releasably secured by means of screws 21 or similar fastening expedients.

The prefabricated installation unit, essentially consisting of the glass assemblies or glazing 2 and 3 together with the spacers 4, the distance pieces 7 as well as in particular the holder frame 5 and the attachment rail means 11, is now inserted from the outside into the fixture means 15, 16, with the ledge member 22 having been removed. To complete the installation it is sufficient to now pull out the securing bolt 13, so that the attachment rail means 11 will be raised under the action of the spring 12 and bears against the upper rail 15 of the surrounding frame or fixture. In so doing, the guide surface 11d of the attachment rail means 11 comes to bear upon the correspondingly inclined leg 15a of the upper rail 15, so that the attachment rail means 11 has imparted to it a lateral movement—to the left of FIGURE 1—for such length of time until its leg 11a bears against the corresponding leg 15c of the upper rail 15. In this position the attachment rail means 11 and together with it the holder frame 5 with the glass assemblies 2 and 3 are retained in a predetermined position within the surrounding frame or fixture means. Now, it is sufficient to again attach the ledge member 22, whereby, with only a few manipulations, the prepared installation unit is placed into its final position.

The mounted glass wall or the like now fulfills all requirements which are reasonably placed upon such glass walls. Specifically, broken elements or components can be replaced in extremely simple manner by disconnecting the angle rails 6a or 8a. Building vibrations, as such oftentimes occur for instance in factories, are dampened by the spring means 12 which is primarily provided in the first instance for facilitating installation, so that breakage due to vibrations need hardly be feared any longer. Wind loads are transmitted by the glass to the offset 16a and the fixture means 15, 16. However, in the first instance, a decisive advantage of the described installation unit resides in rendering possible the most extensive or complete pre-fabrication, the easy transportability and the quick and positive mounting at the construction site.

Figure 3:
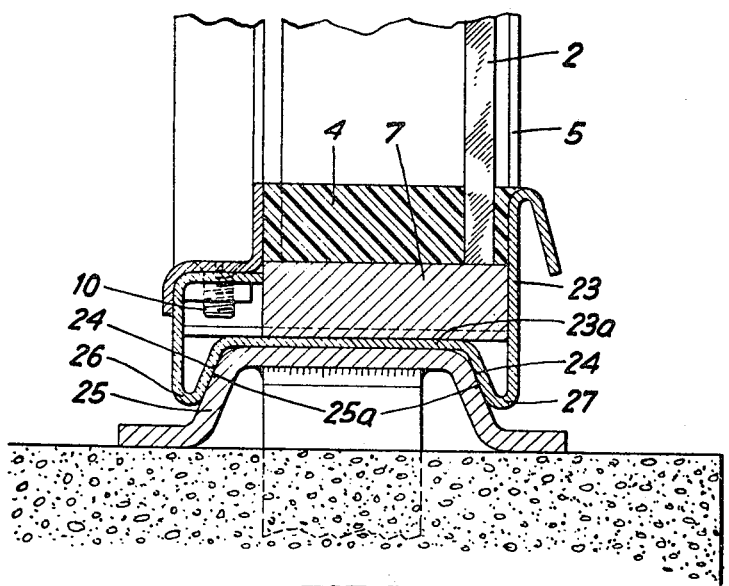
FIGURE 3 is a fragmentary vertical sectional view through the lower portion of an installation unit which is modified somewhat with regard to the arrangement of FIGURE 1.

The variant embodiment according to FIGURE 3 differs from that shown in FIGURES 1 and 2 only through the provision of a different construction of the lower rail 23. Here, the central offset 23a of this lower rail 23 is provided with two steep side surfaces 24 which, when the installation unit is mounted, bear against appropriately inclined surfaces 25a of the lower rail 25 of the fixture means. Consequently, there is obtained an automatic adjustment for also the lower portion of the installation unit, so that it is possible to dispense with the ledge member 22 provided with the first embodiment. Further, owing to this arrangement horizontal forces, in particular wind forces, can be satisfactorily transmitted. Mounting takes place in that the holder frame 5 is raised upwardly, against the action of the spring means 12, within the attachment rail means 11 to an extent sufficient for the inner rib 26 of both ribs 26, 27 formed by the offset 23a to bear against the upper edge or surface of the offset 25. Then, it is sufficient to allow the holder frame 5 to be subjected to the action of the spring means 12 in order to place it in its final position.

Moreover, in FIGURE 3 there has only been depicted a simple glazing or glass assembly in order to illustrate that the holder frame 5 can be utilized in the same manner not only with simple but also with double glazing. Naturally, the advantages which were mentioned during the discussion of the embodiment of FIGURES 1 and 2 are also readily realized with the variant of FIGURE 3.

With the further embodiment depicted in FIGURES 4 and 5, to the bottom of the lintel 28 of a building opening which is to be obturated by a glass wall, there is secured by claw means 29 a stationary, continuous and U-shaped upper rail 30 having downwardly depending legs or leg members 30a and functioning as fixture means. On the other hand, at the surface bounding the lower region of the building opening there is anchored by means of the claw means 31 a likewise U-shaped lower rail 32 which, in relation to the upper rail 30, possesses shorter and upwardly directed legs 32a. Moreover, the joints remaining between the surfaces bounding the building opening at the top and bottom and the relevant rails 30 and 32 are closed, for instance, by a suitable bonding material or putty. Both of the rails 30 and 32 can be constructed as components of a frame-like fixture embedded in the building opening or, however, as structural elements which are independent of one another.

Between the relatively long leg members 30a of the continuous upper rail 30, there are displaceably guided a number—only one being shown for the sake of simplifying the drawing—of attachment rail means 33 which are arranged behind one another and coaxially. These attachment rail means 33 are operably connected via resilient elements, in the depicted embodiment for instance socalled rubber springs 34, with the web 30b of the U-shaped upper rail 30. With the use of rubber springs 34 this connection can be provided in the most simple manner through adhesively bonding the spring ends, on the one hand, with the web 30b and, on the other hand, with the associated attachment rail means 33. From this construction it will be recognized that the attachment rail means 33 are movable against the force of the rubber springs 34 within the upper rail 30 and guided by the leg members 30a thereof.

Each attachment rail means 33 possesses a recess 35 serving as locking or arresting means, wherein the front and rear, that is the side surfaces 33a facing the legs 30a of the upper rail 30 are inclined in order to form guide surface means. However, the possibility exists of only slanting or inclining one of these side surfaces 33a of the recess 35.

The installation unit, in turn, comprises a number, for instance four, of substantially U-shaped glass sheets or plates 36 which are placed leg-to-leg in order to form a flat glass wall, wherein, in each instance, they are connected with one another at the outside of the abutting legs by means of a suitable adhesive material for instance. Moreover, at each second location of contact of the glass sheets for instance, joined together into an installation unit, there is placed in straddling fashion over the abutting U-legs of such glass sheets a connecting element constructed as a mandrel 37 or the like having protruding portions 37a extending past the upper narrow edge of the associated glass sheets. This connecting element 37 can, for example, be adhesively bonded with both of the associated glass sheets 36, so that each installation unit possesses two such mandrels or connecting elements 37. These connecting elements 37 possess inclined surfaces 37b corresponding to those of the associated recess 35 and their dimensions are selected in such a manner that the mandrel-like connecting element 37 can enter the associated recess 35 in order to provide a force locking or positive connection between an attachment rail means 33 and the installation unit. Naturally, the attachment rail means 33 are placed at such a spacing from one another and are affixed in the longitudinal direction behind one another within the upper rail 30, so that the position of the recesses 35 corresponds to that of the mandrel-like connecting elements 37 of the installation unit, and that, with a number of juxtapositioned installation units there can be formed a continuous glass wall.

In order to mount the installation unit formed of the glass sheets or plates it is sufficient to introduce such from below at an angle or canted into the upper rail 30, which canted position is possible because the width of the insertion opening bounded, on the one hand, by the external leg 30a of the upper rail 30 and, on the other hand, by the support 38 arranged at the inner surface of the inner opposite leg 30a, is larger than the length of the legs of the glass sheets 36.

Introduction of the installation element in the upper rail 30 must only proceed in such a manner that the mandrel-like connecting elements 37 enter into the corresponding recess 35 of the different attachment rail means 33, whereafter the attachment rail means 33 under the tension of the rubber springs 34 are pressed upwardly to such an extent, until the lower edge of the installation unit can be moved past the outer leg 32a of the lower rail 32 and can be erected in this lower rail 32 upon the support 39. Now, in order to fix the vertical position the installation unit is pressed not only against the support 39 of the lower rail 32 but also against an appropriate impact member 40, so that for the final positioning of the installation unit, the latter is merely subjected to the action of the rubber springs 34 and there is introduced between the inner side of the glass wall and the outer leg 32a of the lower rail 32 a spacer member 41.

In this manner, owing to the force of the rubber springs 34 each installation unit is pressed against the support 39 and is laterally secured in position by means of the spacer member 41. Furthermore, by virtue of the inclined guide surfaces of both the recesses 35 as well as also the straddling mandrel-like connecting pieces 37 there is insured for the vertical positioning of the installation units and lateral loads resulting from wind pressure are taken up and transmitted via the fixture means to the brick work of the building.

The replacement or exchange of an installation unit can proceed in the most simple manner in that, after removing the spacer member 41 the relevant unit is raised against the spring action of the rubber springs 34 from its support 39 and tilted laterally out of the lower rail 32, and thereafter, removed from the upper rail 30.

Consequently, the installed glass wall fulfills all requirements which may be reasonably placed upon such glass walls. As already explained, it is therefore possible to replace broken components in the most simple manner. Building vibrations, as such for instance occur frequently in factories, are dampened by the spring members 34, which in the first instance are provided for the purpose of facilitating installation or mounting, in such a manner that ruptures or breakage due to these vibrations need no longer be feared. Wind loads are transmitted by the glass via the attachment rail means 33 to the stationary upper rail 30. In the main, however, the primary advantage of the described installation units resides in the possibility of carrying out the most complete or extensive pre-fabrication, the easy transportation of the units and the quick and positive mounting at the construction site, without having to be concerned with any eventual inaccuracies which may occur at the place of construction during mounting of the upper rail. These inaccuracies are compensated for by the plurality of resilient attachment rail means.

It should be apparent from the foregoing detailed description, that the objects set forth at the outset to the specification have been successfully achieved. While there are shown and described present preferred embodiments of the invention, it is to be distinctly understood that the invention is not limited thereto but may be otherwise variously embodied and practiced within the scope of the following claims.

What is claimed is:

1. In combination with fixture means, an installation unit comprising glass elements, connecting means for retaining together said glass elements, at least one displaceable attachment rail means movably mounted relative to said connecting means, guide means disposed substantially parallel to the plane of said glass elements for displaceably guiding said attachment rail means in a direction substantially parallel to the respective plane of each glass element, a plurality of resilient elements effective substantially parallel to the plane of said glass elements, said at least one displaceable attachment rail means being subjected to the action of said resilient elements, said attachment rail means being provided with at least one inclined guide surface for determining the relative position of said glass elements with respect to said fixture means.

2. The combination as defined in claim 1, wherein said parallel guide means is arranged between said connecting means and said attachment rail means, said resilient elements being disposed between said attachment rail means and said connecting means.

3. The combination as defined in claim 2, wherein said attachment rail means incorporates two substantially parallel legs which straddle said connecting means, said inclined guide surface of said attachment rail means facing away from said glass elements and being disposed at an inclination to said parallel legs, said fixture means cooperating with said attachment rail means and including an inwardly directed, inclined guide surface, whereby in the assembled condition of said fixture means and said installation unit both of said guide surfaces thereof extend approximately in parallelism with one another.

4. The combination as defined in claim 3, wherein said connecting means are constructed to provide frame means encircling said glass elements at their peripheral edges.

5. The combination as defined in claim 4, further including detachable securing bolt means for connecting said attachment rail means with said frame means in order to facilitate transport to and mounting at the place of use.

6. The combination as defined in claim 4, wherein an attachment rail means is only provided at one side of said frame means, the opposite side of said frame means being provided with two inclined guide surface means, said fixture means having two inclined guide surface means cooperating with said guide surface means of said frame means.

7. The combination as defined in claim 1, wherein said parallel guide means is arranged between said fixture means and said attachment rail means, said resilient elements being disposed between said attachment rail means and said fixture means.

8. The combination as defined in claim 7, wherein said fixture means possesses a substantially U-shaped configuration having a pair of substantially parallel leg members, said attachment rail means being displaceably arranged within said U-shaped fixture means, said resilient elements operably connecting said attachment rail means with said fixture means, said attachment rail means being provided with two guide surfaces which extend lengthwise thereof and inclined with respect to said pair of parallel leg members of said substantially U-shaped fixture means.

9. In combination with fixture means, an installation unit comprising glass elements, connecting means for retaining together said glass elements, a plurality of resilient elements effective substantially parallel to the plane of said glass elements, at least one displaceable attachment rail means subjeected to the action of said resilient elements, guide means substantially parallel to the plane of said glass elements for displaceably guiding said attachment rail means, said attachment rail means being provided with at least one inclined guide surface for determining the relative position of said glass elements with respect to said fixture means, said parallel guide means being arranged between said fixture means and said attachment rails means, said resilient elements being disposed between said attachment rail means and said fixture means, said attachment rail means incorporating a pair of inclined guide surfaces, said glass elements possessing a substantially U-shaped configuration having protruding leg members, the external face of said leg members of adjacent glass elements abutting one another, said connecting means having projecting portions which extend past the narrow side of said abutting leg members of said glass elements to hold said abutting leg members together, said projecting portions having two inclined guide surfaces which are substantially complementary to said pair of inclined guide surfaces of said attachment rail means.

10. In combination with fixture means, an installation unit comprising glass elements, connecting means for retaining together said glass elements, a plurality of resilient elements effective substantially parallel to the plane of said glass element, at least one displaceable attachment rail means subjected to the action of said resilient elements, guide means substantially parallel to the plane of said glass elements for displaceably guiding said attachment rail means, said attachment rail means being provided with at least one inclined guide surface for determining the relative position of said glass elements with respect to said fixture means, said parallel guide means being arranged between said fixture means and said attachment rail means, said resilent elements being disposed between said attachment rail means and said fixture means, said attachment rail means being subdivided into sections, said sections being arranged in spaced relation to said fixture means at a distance approximately corresponding to the spacing of said leg members of said glass elements.

11. In combination with fixture means, an installation unit comprising glass elements, connecting means for holding together said glass elements, at least one displaceable attachment rail means cooperating with said connecting means and said fixture means, said attachment rail means being movably mounted relative to said connecting means, resilient means effective substantially parallel to the plane of said glass elements, said attachment rail means being subjected to the action of said resilient elements, said attachment rail means being provided with at least one inclined guide surface for determining the relative position of said glass elements with respect to said fixture means.

References Cited

UNITED STATES PATENTS

| | | | |
|---|---|---|---|
| 2,077,808 | 4/1937 | Peremi et al. | 49—368 |
| 2,157,426 | 5/1939 | Nelson | 49—419 |
| 2,278,666 | 4/1942 | Peremi et al. | 49—463 X |
| 2,863,180 | 12/1958 | Birdwell et al. | 52—403 X |

FOREIGN PATENTS

| | | |
|---|---|---|
| 863,440 | 3/1961 | Great Britain. |

FRANK L. ABBOTT, *Primary Examiner.*

C. G. MUELLER, *Assistant Examiner.*